(12) United States Patent
Petillo et al.

(10) Patent No.: US 7,282,073 B2
(45) Date of Patent: Oct. 16, 2007

(54) METHOD AND SYSTEM FOR GENERATING HYDROGEN BY DISPENSING SOLID AND LIQUID FUEL COMPONENTS

(75) Inventors: Phillip J. Petillo, Ocean, NJ (US); Stephen C. Petillo, Ocean, NJ (US)

(73) Assignee: Millennium Cell, Inc., Eatontown, NJ (US)

( * ) Notice: Subject to any disclaimer, the term of this patent is extended or adjusted under 35 U.S.C. 154(b) by 450 days.

(21) Appl. No.: 10/115,269

(22) Filed: Apr. 2, 2002

(65) Prior Publication Data

US 2004/0047801 A1    Mar. 11, 2004

(51) Int. Cl.
    *B01J 7/00* (2006.01)
(52) U.S. Cl. .............................. 48/61; 48/62; 48/197 R; 422/211; 422/222; 422/224; 422/225; 422/232; 422/233; 422/657; 423/658; 423/658.2
(58) Field of Classification Search .................. 48/61, 48/62 R, 197 R; 422/211, 222, 224, 225, 422/232, 233; 423/657, 658, 658.2
See application file for complete search history.

(56) References Cited

U.S. PATENT DOCUMENTS

| | | | |
|---|---|---|---|
| 2,534,533 A | | 12/1950 | Schlesinger et al. |
| 2,711,306 A | * | 6/1955 | Levi ............................ 366/273 |
| 3,210,157 A | | 10/1965 | Lewis, Jr. et al. |
| 3,458,288 A | * | 7/1969 | Lafyatis et al. ............. 422/113 |
| 3,993,732 A | | 11/1976 | Filby |
| 4,002,726 A | | 1/1977 | Filby |
| 4,676,805 A | * | 6/1987 | Richter et al. ............ 48/197 R |
| 4,828,145 A | | 5/1989 | Raufast |
| 5,372,617 A | | 12/1994 | Kerrebrock et al. |
| 5,728,464 A | * | 3/1998 | Checketts .................... 428/403 |
| 5,804,329 A | | 9/1998 | Amendola |
| 5,817,157 A | | 10/1998 | Checketts |
| 2001/0022960 A1 | | 9/2001 | Kojima et al. |
| 2002/0025462 A1 | * | 2/2002 | Nakanishi et al. ............ 429/19 |

FOREIGN PATENT DOCUMENTS

EP    0299732 A2 *  1/1989  ...................... 49/8

(Continued)

OTHER PUBLICATIONS

Kaufman et al.: Hydrogen Generation by Hydrolysis of Sodium Tetrahydroborate: Effects of Acids and Transition Metals and their Salts. J. Chem. Soc. Dalton Trans. pp. 307-313 (1985).

(Continued)

*Primary Examiner*—Glenn Caldarola
*Assistant Examiner*—Vinit H. Patel
(74) *Attorney, Agent, or Firm*—Dickstein Shapiro LLP

(57) ABSTRACT

Hydrogen is generated through the use of a fuel solution that is prepared using solid fuel component, e.g., a metal borohydride, and a liquid fuel component, e.g. water. Both of these components are dispensed in response to control signals. The solid fuel component can take different forms, including but not limited to granules, pellets and powder. Various devices, which operate in response to control signals, are disclosed for dispensing predetermined amounts of the solid and liquid components. Advantageously, this solution can be prepared, as needed, so as to obviate the need for storing and disposing of large amounts of highly alkaline fuel and discharged fuel solutions.

29 Claims, 6 Drawing Sheets

FOREIGN PATENT DOCUMENTS

| | | |
|---|---|---|
| EP | 1 067 091 | 10/2001 |
| EP | 1170249 | 1/2002 |
| GB | 2264112 | 8/1993 |
| WO | WO98/30493 | 7/1998 |
| WO | WO 01/51410 | 7/2001 |
| WO | WO 01/74710 | 10/2001 |
| WO | WO 01/85606 | 11/2001 |

OTHER PUBLICATIONS

MacCarley: Development of a Sodium Borohydride Hydrogen Fuel Storage System for Vehicular Application. Symp. On Alternate Fuel Res. 20: 315-321 (1976).

Brown et al.: New, Highly Active Metal Catalysts For the Hydrolysis of Borohydride. JACS 84: 1493-1494 (1962).

Brown et al.: Catalyzed Hydrolysis of Sodium Borohydride. Industrial and Engineering Chemistry 3: 211-214 (1960).

Schlesinger et al.: Sodium Borohydride and Its Use as a Reducing Agent and in the Generation of Hydrogen. J. Amer. Chem. Soc. 75: 215-219 (1953).

Maurice E. Indig and Richard N. Snyder, "Sodium Borohydride, An Interesting Anodic Fuel", Journal of the Electrochemical Society, vol. 109, pp. 1104-1106, Nov. 1962.

* cited by examiner

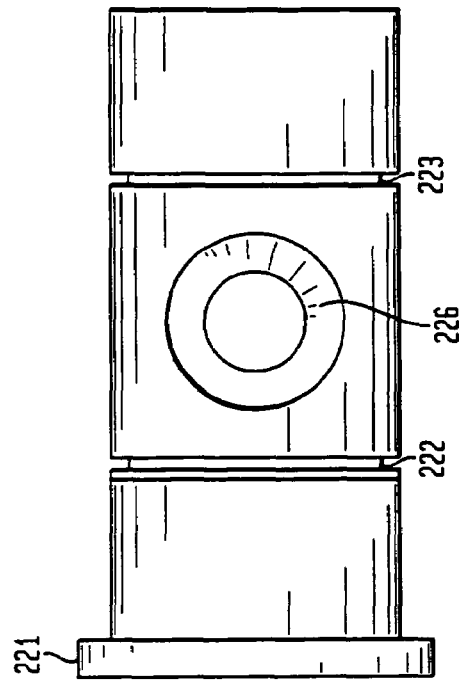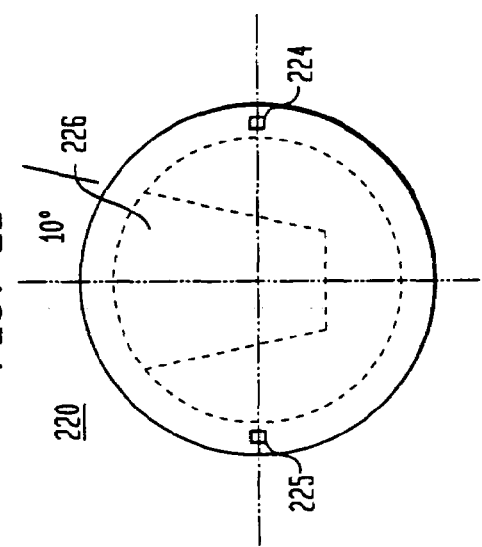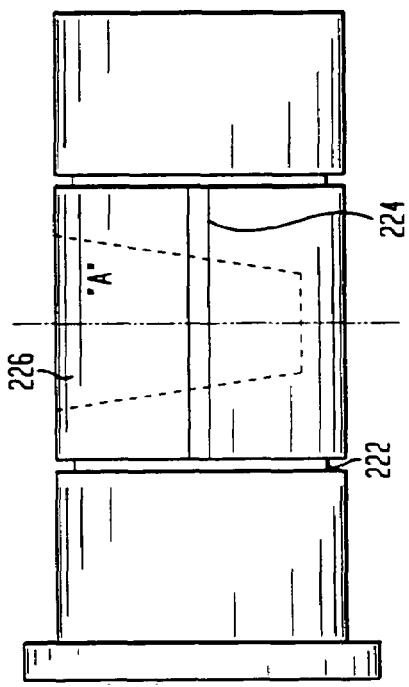

METHOD AND SYSTEM FOR GENERATING HYDROGEN BY DISPENSING SOLID AND LIQUID FUEL COMPONENTS

FIELD OF THE INVENTION

This invention relates generally to the generation of hydrogen and, more particularly, to the generation hydrogen from a "fuel" that is formed by dispensing solid and liquid fuel components.

BACKGROUND OF THE INVENTION

The hydrolysis reactions of many complex metal hydrides, including sodium borohydride ($NaBH_4$), have been commonly used for the generation of hydrogen gas. The governing chemical reaction may be expressed as:

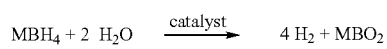

$$MBH_4 + 2\ H_2O \xrightarrow{catalyst} 4\ H_2 + MBO_2 \quad (1)$$

where $MBH_4$ and $MBO_2$ respectively represent a metal borohydride and a metal metaborate. The hydrolysis of sodium borohydride is typically slow at room temperature and heat or a catalyst, e.g., acids, a variety of transition metals, such as ruthenium, cobalt, nickel, or iron, or corresponding metal borides in solution or deposited on inert supports or as solids, can be used to accelerate the hydrolysis reaction. In addition, the rate of decomposition of the complex metal hydride into hydrogen gas and a metal metaborate is pH dependent, with higher pH values hindering the hydrolysis. Accordingly, solutions of a complex metal hydride, such as sodium borohydride, a stabilizer, such as sodium hydroxide (NaOH), and water are used as the fuel, i.e., the consumable element, from which the hydrogen gas is generated. To expedite the production of the hydrogen gas, the fuel is passed over a catalyst. The output of this process is hydrogen gas and a discharged fuel solution. When the complex metal hydride is sodium borohydride, the discharged fuel is a slurry of sodium metaborate. To meet the demands of commercial applications, most hydrogen generating systems also store the fuel and such storage gives rise to several disadvantages. One disadvantage arises from the presence of the stabilizer. The function of the stabilizer is to raise the pH value of the fuel solution and, thereby prevent the hydrolysis until the solution contacts the catalyst. As the stabilizer does not participate in any chemical reaction, both the fuel and discharged fuel solutions have a high pH value. Typically, both the fuel and discharged fuel solutions have pH values between 13 and 14. This high pH requires that the transport of both the fuel and discharged fuel solutions comport with governmental regulations which would increase the cost of hydrogen generation. The presence of these high pH solutions is also an impediment to the commercialization and public acceptance of the process. Additional costs are imposed by the presence of these high pH solutions as they react with a variety of metals. To avoid these reactions, non-reactive materials, such as stainless or non-reactive plastics, must be used in the hydrogen generation system.

While solid complex metal hydrides in a variety of forms, including powder, pellets and granules, are manufactured for pharmaceutical applications, their use in commercial systems for the controlled and measured generation of hydrogen has not been provided.

Based on the foregoing, it would be extremely desirable if a hydrogen generation system could be devised which meets the needs of commercial applications and which overcomes the problems associated with the use of premixed fuel solutions.

SUMMARY OF THE INVENTION

In accordance with the present invention, hydrogen is generated through the use of a fuel solution that is prepared by dispensing solid and liquid fuel components. Advantageously, this solution can be prepared, as needed, so as to obviate the need for storing and disposing of large amounts of highly alkaline fuel and discharged fuel solutions. The present invention, however, is not limited to the generation of hydrogen on an as needed basis.

In the disclosed embodiments, the solid fuel component is a metal borohydride that is stored in its dry form and mixed with a liquid, as needed. In the disclosed embodiments the liquid includes water. The solid fuel component can take different forms, including but not limited to granules, pellets and powder. Various devices, which operate in response to a predetermined condition, are disclosed for dispensing predetermined amounts of the solid and liquid fuel components. One such dispensing mechanism for the solid fuel component is a rotary cylinder that dispenses predetermined amounts of the solid fuel component in granule or other forms in response to a control signal indicating a need for generating more hydrogen. Another is a "gun clip" mechanism for dispensing the solid fuel component in pelletized form of a predetermined size. The dispensing mechanism for the liquid fuel component can also take various forms, including a valve that is actuated by either a control signal or movement of a float mechanism.

In the preferred embodiment of the present invention, the predetermined amounts of solid and liquid fuel components are mixed within a chamber so as to form a fuel solution having a uniform concentration of the metal borohydride. In this embodiment, it is also preferable to pass the fuel solution over a catalyst to accelerate the generation of hydrogen.

BRIEF DESCRIPTION OF THE DRAWINGS

Further objects, features and advantages of the present invention will become apparent from the following written description taken in conjunction with the accompanying figures showing illustrative embodiments of the invention, in which:

FIGS. 2a-d show a solid fuel component dispenser for use in the system of FIG. 1;

DETAILED DESCRIPTION

Figure 1:
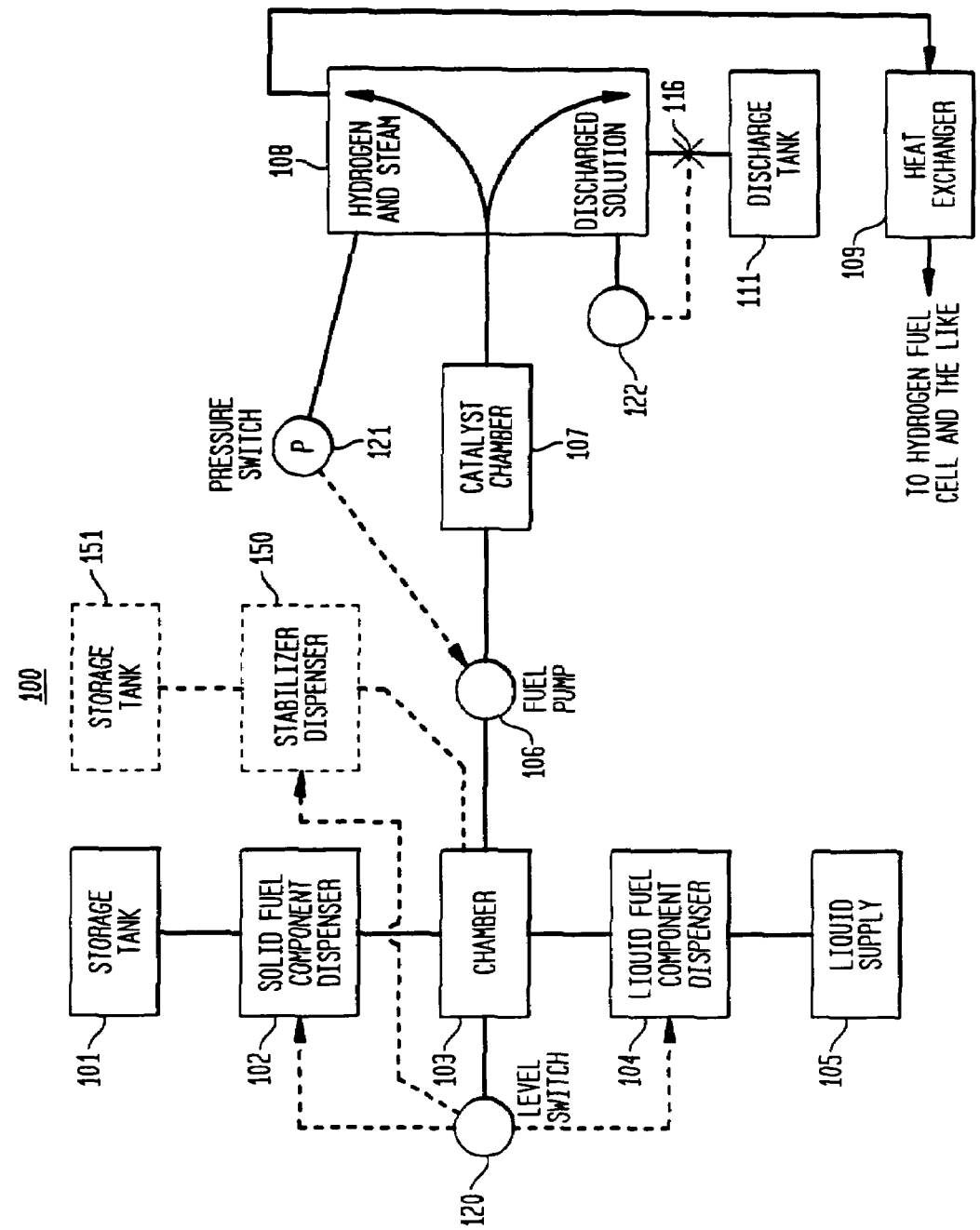
FIG. 1 shows an illustrative hydrogen generation system using solid and liquid fuel components in accordance with the principles of the invention.

FIG. 1 illustrates hydrogen generating system 100 in accordance with the principles of the present invention. System 100 includes storage tank 101, solid fuel component dispenser 102, liquid fuel component dispenser 104, liquid fuel component liquid supply 105, fuel pump 106, catalyst chamber 107, separator 108, discharge tank 111, and heat exchanger 109. The output of heat exchanger 109 supplies hydrogen to a device that consumes this gas, such as a hydrogen fuel cell or hydrogen-burning engine or turbine. Alternatively, the generated hydrogen gas can be coupled to one or more storage vessels.

At least one complex metal hydride in a solid form is stored in storage tank 101. This material serves as the solid component of the fuel for generating hydrogen in system 100. The hydrogen generated is in the form of a gas. The complex metal hydrides have the general chemical formula $MBH_4$. M is an alkali metal selected from Group I (formerly Group 1A) of the periodic table, examples of which include lithium, sodium, or potassium. M may, in some cases, also be ammonium or organic groups. B is an element selected from group 13 (formerly Group IIIA) of the periodic table, examples of which include boron, aluminum, and gallium. H is hydrogen. The complex metal hydride illustratively is sodium borohydride ($NaBH_4$). Examples of others can be used in accordance with the principles of the invention include, but are not limited to $LiBH_4$, $KBH_4$, $NH_4BH_4$, $(CH_3)_4NBH_4$, $NaAlH_4$, $KAlH_4$, $NaGaH_4$, $LiGaH_4$, $KGaH_4$, and the combinations thereof. The complex metal hydrides in solid form have an extended shelf life as long as they are protected from water and can take various forms, including but not limited to granules, powder and pellets.

The use of sodium borohydride as a fuel component for hydrogen generation is particularly desirable for certain applications. It has been found that the hydrogen gas produced using sodium borohydride is typically of high purity with no carbon-containing impurities, and high humidity. Hydrogen produced by the hydrolysis of any chemical hydride will have similar characteristics. However, no carbon monoxide has been detected in gas streams produced by sodium borohydride. This is noteworthy because most fuels cells, notably PEM and alkaline fuel cells, require high quality hydrogen gas and carbon monoxide will poison the catalyst and eventually corrupt the fuel cell. Other methods of generating hydrogen, such as fuel reforming of hydrocarbons provides a hydrogen gas stream containing carbon monoxide and further processing is then required to remove it. Carbon dioxide is also present in the hydrogen gas stream.

Solid fuel component dispenser 102 provides a predetermined amount of the solid fuel component from storage tank 101 into chamber 103 upon receiving a first control signal. Dispenser 102 is illustratively made of materials that do not chemically react with the solid fuel component, including but not limited to plastics, PVC polymers, and acetal or nylon materials. Dispenser 102, once actuated, may be controlled or otherwise designed to provide a predetermined motion that provides a predetermined amount of the solid fuel component to chamber 103. The operational control of the solid fuel component dispenser can be provided by a variety of arrangements, such as revolving counters, micro switches, and optical shaft encoders. The solid fuel component dispenser itself can also be implemented by a variety of structures. One arrangement to be discussed in greater detail hereinbelow utilizes a rotational cylinder. Another utilizes a gun clip type dispenser. Other non-limiting examples for the solid fuel component dispenser are commercially available iris valves, air or screw feeds, and equivalent powder-dispensing valves.

Similarly, liquid fuel component dispenser 104 provides a predetermined amount of the liquid fuel component from supply 105 to chamber 103 upon receiving the first control signal. In the disclosed embodiments, the liquid fuel component is water. Other liquid fuel components, such as anti-freeze solvent with water, can be used as well. Dispenser 104 illustratively is a type 303 stainless steel solenoid valve supplied by McMaster-Carr Supply Company of Atlanta, Ga. Stainless steel is a desirable valve material when the prepared fuel solution includes a stabilizer, such as sodium hydroxide. If a stabilizer is not dispensed, then brass or plastic can be used as the valve material.

Upon receiving the first control signal, the valve is opened by energizing the solenoid in the valve. Dispenser 104 is illustratively controlled by a timer. The timer provides sufficient duration to energize the solenoid in the valve, so that the valve can discharge predefined volume of liquid to chamber 103. Non-limiting examples, such as flow meters, float switches, or sensors, can also be used to control the liquid fuel component dispenser.

Illustratively, the timers for dispensers 102 and 104 are, but not limited to, a Model 4970 programmable interval timer produced by Artisan Controls Corporation of Parsippany, N.J. Each timer is programmed to the respective predetermined duration, such that when the first control signal is received, the respective dispenser dispenses the respective predetermined amount during that predetermined duration. The timers are set to start the dispensing of the solid and liquid fuel components simultaneously. A delay may be added to either timer, so that the solid fuel component is dispensed first, then the liquid fuel component, or vice versa. It is desirable that the liquid component or other moisture be precluded from entering storage tank 101 as this activates the hydrolysis of the solid fuel component, albeit slowly at room temperature, and thereby shortens the "life" of this fuel component.

Liquid supply 105 is, illustratively, a connection to a water line coupling water from a public water supply or private well. A filled water tank can be used as well. For temperatures below the freezing point of the water, an organic solvent, such as ethylene glycol, can be added to the mixing tank to depress the freezing point of water. Alternatively, the water in liquid supply 105 can be heated.

For some applications, system 100 can be modified to incorporate a third dispenser to provide sodium hydroxide in solid or liquid form to chamber 103. On such modification in phantom lines is depicted in FIG. 1. As shown, dispenser 150 delivers predetermined measured amounts of stabilizer, such as sodium hydroxide, in solid or liquid form from storage tank 150 to chamber 103. Alternatively, the stabilizer in liquid form can be dispensed in combination with the liquid fuel component via dispenser 104. In such case, dispenser 104 would provide an appropriate amount of an aqueous solution of sodium hydroxide of a specified concentration to chamber 103 for the amount of solid fuel component provided by dispenser 102. In yet another arrangement, the stabilizer can be formulated as part of the solid fuel component. In such case, they would both be provided to chamber 103 via dispenser 102. The amount of stabilizer added is oftentimes that necessary to raise the pH value to a level that completely preclude the generation of hydrogen until the mixture is exposed to a catalyst. A pH value of 13 provides this result. However, in certain applications, it may be desirable to raise the pH level of the mixture to a level below 13 that does not inhibit but, instead, merely slows down the generation of hydrogen. In such case, the use of the stabilizer may not require the use of the catalyst.

Chamber 103 preferably mixes the sold and liquid fuel components to produce a uniform fuel solution, i.e., one having a uniform concentration. Chamber 103 is illustratively equipped with level switch 120. Level switch 120 is illustratively activated by a level sensor, such as a float (not shown), in chamber 103. When the level of the mixed solution drops below a set point, level switch 120 switches its position so as to couple the first control signal to, and thereby activate, the solid fuel component dispenser 102 and the liquid fuel component dispenser 104. Level switch 120 can have another set point that shuts off the dispenser 104 when the level of the solution in chamber 103 reaches a predetermined level. Alternatively, dispenser 104 can be controlled by the movement of a float mechanism (not shown) in chamber 103 that solely controls this dispenser.

Fuel pump 106 pumps the mixed fuel solution to catalyst chamber 107. Fuel pump 106 illustratively is a cylinder pump, such as one provided by Allenair Corp. of Mineola, N.Y., having a small ½ inch bore, single-ended brass cylinder and one inch stroke. Pump 106 is illustratively operated by a motor, such as one designated as part number 110153 and provided by Maxon Precision Motors, Fall River, Mass.

Catalyst chamber 107 includes a hydrogen generation catalyst for activating the hydrolysis reaction of the mixed solution to generate hydrogen. The heat produced may also vaporize some of the water; thus, the generated hydrogen has certain humidity. Catalyst 107 is described in greater detail hereinbelow.

The generated hydrogen (hydrogen and steam) and discharged solution flow into separator 108. The hydrogen and steam exit separator 108 from the vent located at the top of separator 108. The discharged fuel solution, on the other hand, is gravitationally deposited at the bottom of separator 108. The discharged solution can be drained from drain valve 116 for collection and recycling back to a liquid fuel solution or a solid fuel component.

Separator 108 is equipped with pressure switch 121 and level switch 122. An example of pressure switch 121 is Model P117G provided by Whitman Controls Corporation, Bristol, Conn. Switch 121 toggles to a position when the pressure of the generated hydrogen in separator 108 exceeds a predetermined set point. In a number of applications, this pressure set point is between 12 and 15 pounds per square inch (p.s.i.) Of course, depending on the application, other set points may be used. The operation of pressure switch 121 controls fuel pump 106. When the pressure exceeds the predetermined set point, pressure switch 121 turns pump 106 off along with the flow of the mixed fuel solution from chamber 103 to catalyst chamber 107. Both pump 106 and separator 108 are equipped with check valves (not shown), so that the mixed fuel solution, the hydrogen, and the steam do not flow backward. The check valves, illustratively, are made of brass or plastic or other materials suitable for exposure to the mixed fuel, hydrogen and steam or water vapor.

The hydrogen and steam pass through heat exchanger 109 to adjust the relative humidity of the hydrogen. The output of exchanger 109 can be coupled to a device that consumes hydrogen gas in its operation, such as a fuel cell 110. The fuel cell can be of virtually boundless sizes and shapes. This is a preferred arrangement as the generation of hydrogen by system 100 is on "as needed" basis. That is, the quantity of hydrogen gas generated tracks that required by the hydrogen-consuming device. However, the output of heat exchanger 109 can also be coupled to a tank that stores the hydrogen gas. In either event, the mixed solution in chamber 103 need not be used immediately because the hydrolysis reactions of complex metal hydrides at room temperature (25° C.) is typically slow. It has been observed in an initial test that when NaOH is used, the mixed solution can stay in mixing chamber 103 for two days before being coupled to catalyst chamber 107 without any observable problems.

Level switch 122 controls drain valve 116. Level switch 122 is activated by a level sensor, such as a float (not shown) in separator 108. When the level of the discharged solution in separator 108 exceeds a predetermined set point, level switch 122 switches and in response thereto drain valve 116 opens to discharge the discharged fuel solution into discharge tank 111.

The pressure and level switches can be replaced with sensors for sending their respective readings to a controller. The controller can then control the various devices in system 100, i.e., the dispensers, pumps, valves, etc. An advantage of this arrangement is that the reading that activates any particular device is readily adjustable through a user-friendly interface known to those skilled in the art.

The maximum percentage by weight of the solid fuel component to be mixed with the dispensed amount of liquid fuel component should be not greater than the maximum solubility of the solid fuel component in that amount of liquid fuel component. For example, the maximum solubility of $NaBH_4$, $LiBH_4$, and $KBH_4$ are 35%, 7%, and 19%, respectively. Thus, for $NaBH_4$, the maximum percentage by weight should be less than 35%. The following table illustratively shows three mixed solutions of $NaBH_4$ with different predetermined concentrations (% by weight) and the associated predetermined amounts of the $NaBH_4$ in weight and the water in volume:

| Concentration of the mixed solution of $NaBH_4$ in weight % | Weight of the $NaBH_4$ | Volume of water in milliliters |
| --- | --- | --- |
| 10 | 100 | 900 |
| 20 | 200 | 800 |
| 30 | 300 | 900 |

Fuel pump 106 can be replaced with a valve if system 100 is arranged such that the mixing solution is gravitationally delivered to catalyst chamber 107. The valve is closed when the pressure in separator 108 exceeds the predetermined set point. Also, heat exchanger 109 can be omitted, if the humidity is not a concern for a particular application.

System 100 need not include a catalyst chamber if the pH value of the mixture of solid and liquid fuel components is below 13, but it is oftentimes preferable that such a chamber be incorporated in system 100 to accelerate the generation of hydrogen. The design of such chambers and the various types and dispositions of the catalyst within the chamber are well-known. An illustrative embodiment of catalyst chamber 107 is described in U.S. patent application Ser. No. 09/979, 363 filed Jan. 7, 2000, for "A System for Hydrogen Generation", hereby incorporated by reference. Preferably, catalyst chamber 107 also includes a containment system for the catalyst. A containment system, as used herein, includes any physical, chemical, electrical, and/or magnetic means for separating the hydrogen generation catalyst from the reacted mixed solution.

The different parts of system 100 may be connected by brass tubing. The use of stainless or non-reactive plastics is not required because the mixed fuel solution and the discharged fuel solution do not have high pH values. Other materials, such as almost any plastic, e.g., PVC, brass, copper, etc. can be used as well.

Figure 2A:
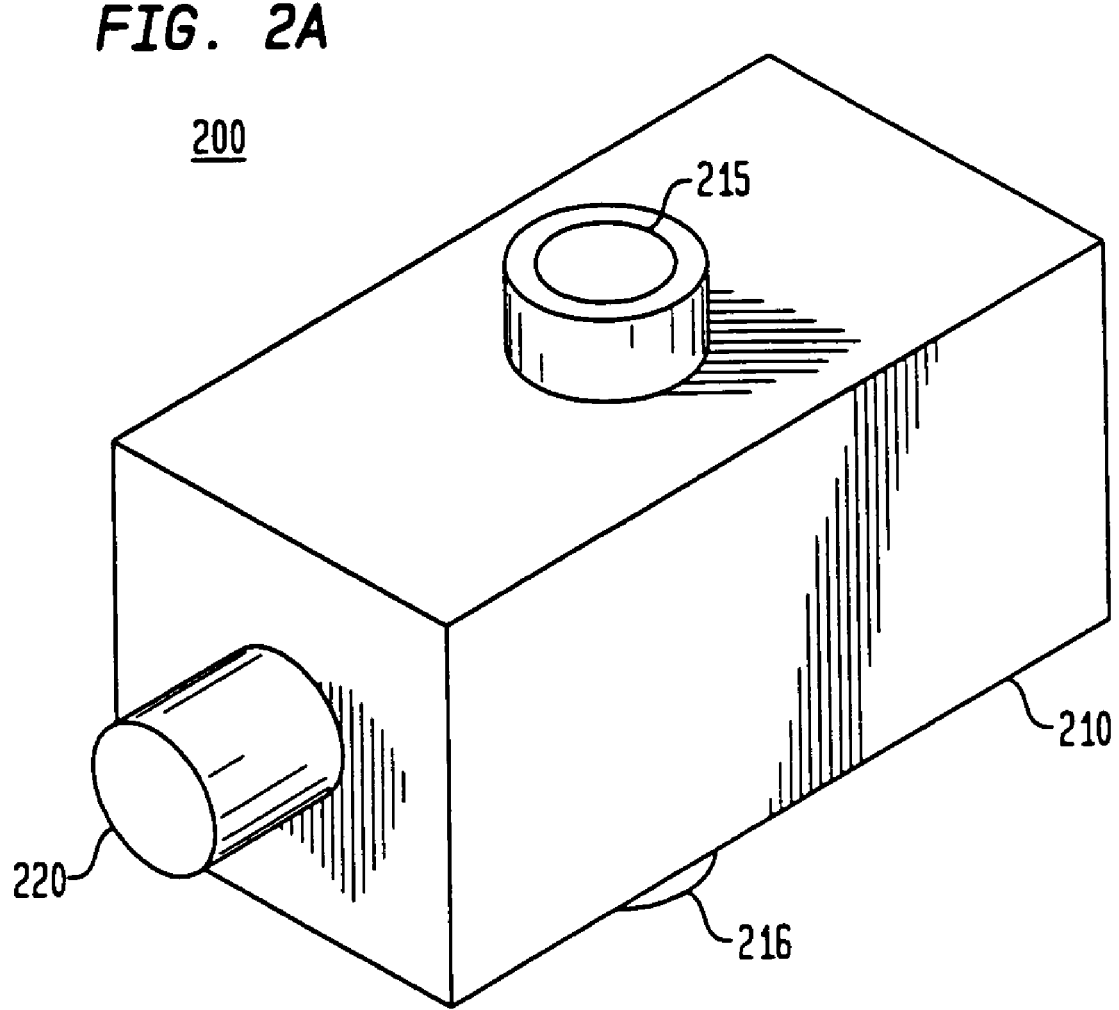

FIGS. 2a-d show an embodiment 200 of a solid fuel component dispenser for use in system 100. While this dispenser provides the solid fuel component to chamber 103, it can be used for other applications. The solid fuel component to be dispensed by the dispenser shown in FIGS. 2a-d can be of a variety of forms, including fine powers, granules, capsules, tablets, and pellets, although the granular form is preferred. As shown in FIG. 2a, the dispenser includes case 210 and cylinder 220. Case 210 has an opening 215 at the top for connecting to storage tank 101 and an opening 216 at the bottom for connecting to chamber 103.

FIGS. 2b-d show front, top, and side views of cylinder 220, respectively. Cylinder 220 includes a centrally disposed trough 226. When cylinder 220 is rotated such that trough 226 overlaps opening 215, the solid fuel component from storage tank 101 gravitationally fills trough 226. Other methods of filling, such as pumping and the like can also be used to fill the trough. In any event, after filling of the trough and upon rotation of cylinder 220 within housing 210 so that trough 226 overlaps opening 216, the solid fuel component in trough 226 is provided to chamber 103. The cross section of trough 226 is illustratively circular with a cross-sectional area that gradually increases from the bottom to the top of the trough. This facilitates the loading and dispensing of the solid fuel component. The taper of the trough is illustratively 8 degrees. Other designs of the cylinder 220 have used a trough taper of 10 degrees. In the disclosed embodiment, trough 226 illustratively holds 7 milliliters of the solid fuel component. Thus, rotational cylinder 200 delivers 7 milliliters of fuel for each rotation of cylinder 220. Cylinder 220 includes four grooves, 222-225 for receiving seals (not shown). The seals provide sealing between the periphery of cylinder 220 and the cylinder-receiving opening in housing 210. The arrangement of seals precludes the entry of moisture from chamber 103 into the dispenser and storage tank 101 so that the solid fuel component does not clump in the storage tank and that there is no generation of hydrogen gas in the solid fuel component storage tank. The seals also assure that what is fed into the trough is dispensed into chamber 103. Grooves 222 and 223, as shown in FIG. 2c are disposed to the left and right of trough 226. Grooves 222 and 223 receive "O rings" that are illustratively made of EPDM (Ethylene Propylene Diene Monomer) and are self-lubricating. Longitudinal groove 224, as shown in FIG. 2d, and longitudinal groove 225, not shown and opposite to groove 224, provide additional sealing. Grooves 224 and 225 are parallel to the axis of cylinder 220. One end of grooves 224 and 225 connects to groove 222 and the other end to groove 223. Preferably, grooves 224 and 225 are 180° apart and equally spaced from trough 226. The seals in grooves 224 and 225 prevent moisture from entering trough 226 and storage tank 101 upon rotation of cylinder 220. Cylinder 220 is illustratively constructed of polyetheretherketone (PEEK) plastic.

Rotational cylinder 220 is illustratively driven by a motor (not shown) such as a 12 volt, direct current, permanent magnet gear motor that is coupled to cylinder 220. Other driving mechanisms, such as an air-driven wheel may be used to rotate cylinder 220. In any event, upon receiving the first control signal, cylinder 220 rotates one or more times so that it provides a predetermined amount of the solid fuel component to chamber 103. If, for example, trough 226 carries 100 grams of the solid fuel component and the amount of this solid fuel component necessary to provide the desired fuel solution concentration is 300 grams, the timer provides three rotations of cylinder 220.

Figure 3:
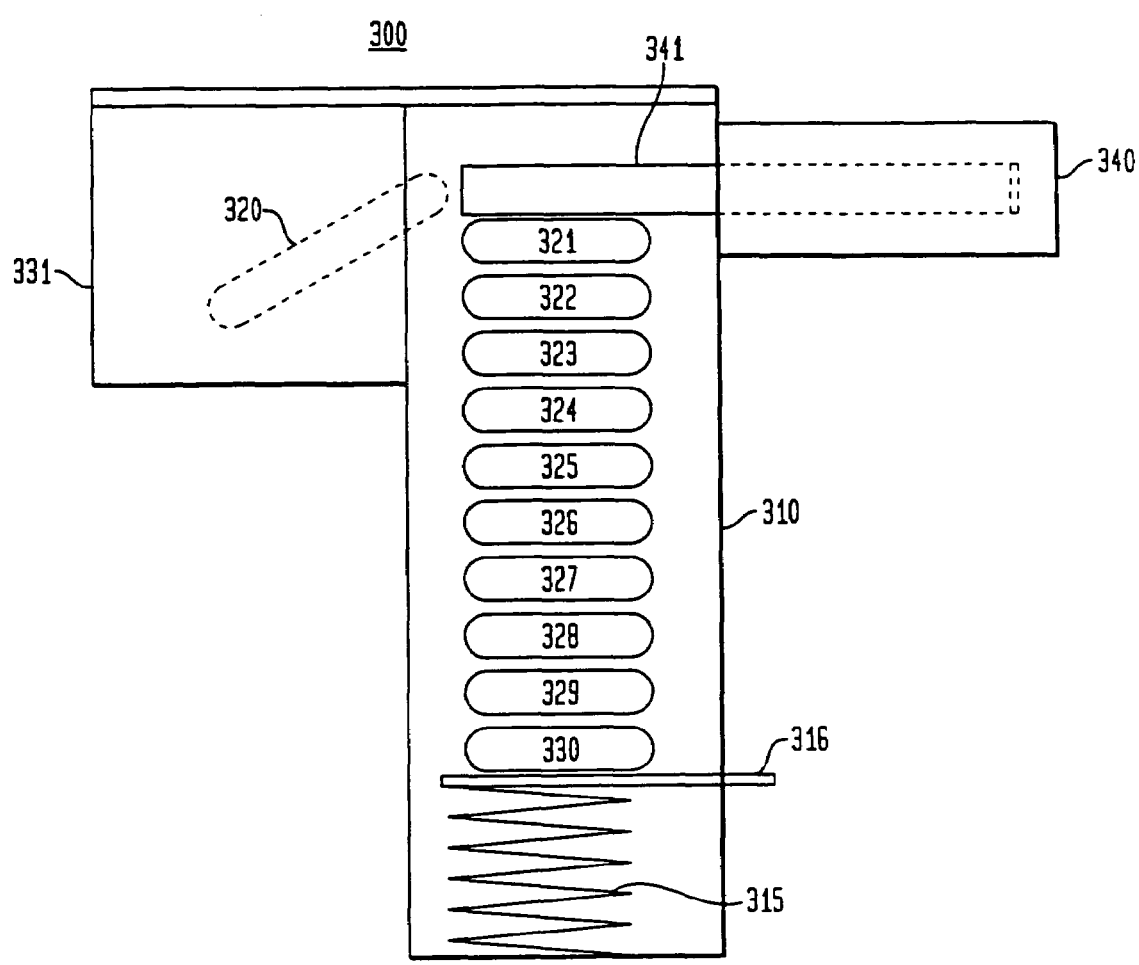
FIG. 3 shows another solid fuel component dispenser for use in the system of FIG. 1.

FIG. 3 illustrates another embodiment of a solid fuel component dispenser 102. As shown in FIG. 3, dispenser mechanism 300 utilizes the mechanism embodied in a gun clip to deliver the solid fuel component in pelletized form to chamber 103. Dispenser 300 can be designed to dispense more than one pellet at a time. Fuel dispenser 300 includes clip 310 and a pellet displacing mechanism 340 having a displacing rod 341. Mechanism 340 may be a solenoid that is actuated by the first control signal. Upon such activation, rod 332 of the solenoid displaces a pellet and then retracts a sufficient amount so that the next pellet in the dispenser is positioned for displacement. In lieu of a solenoid, an air cylinder or motor can be used to actuate rod 341 in well-known fashion in response to a control signal. As shown in FIG. 3, pellet 320 has been dispensed, while pellet 321 is the next pellet to be dispensed. Chamber 331 receives each dispensed pellet and couples it to chamber 103.

Clip 310 incorporates a spring 315 at the bottom of the clip that exerts an upward force on each pellet in a well known manner such that a pellet is in position for displacement by mechanism 330 so long as there are pellets in clip 310. Pellets 320-330 are stacked on top of one another in the clip. Handle 316 is attached to the end of spring 315 to permit compression of spring 315 and facilitate the reloading of clip 310 with pellets. The timer controlling solid fuel dispenser 300 should dispense the proper number of pellets as needed to provide the desired uniform fuel solution.

Figure 4:
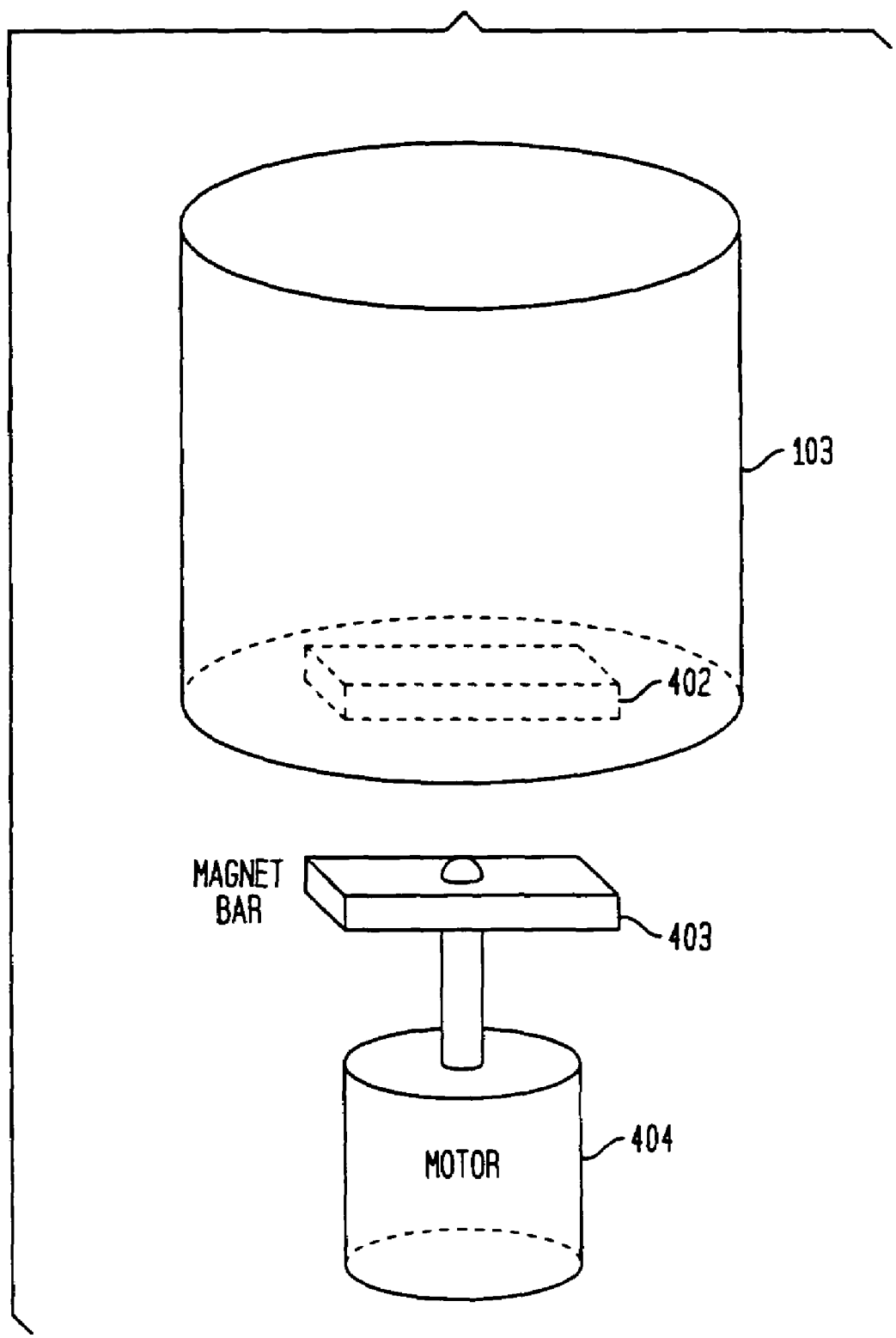
FIG. 4 shows an embodiment of a mixing chamber for use in the system of FIG. 1.

To accelerate the mixing of the solid and liquid fuel components, chamber 103 is preferably equipped with a mixing mechanism. In the embodiment shown in FIG. 4, chamber 103 utilizes magnets for mixing. The mixing mechanism includes magnet rod 402, magnet bar 403, and motor 404. Magnet rod 402, which is illustratively enclosed in polytetrafluoroethylene (PTFE) polymers, is located inside chamber 103. Magnet bar 403 rotates with the rotation of the shaft of motor 404. Both magnet bar 403 and motor 404 are external to mixing chamber 103. The rotation of magnet rod 402 should continue until all of the solid fuel component has been dissolved. Thereafter, it may be periodically restarted at predetermined intervals for specific time periods. Motor 404, illustratively, is Colman 100 RPM, 24 V, DC permanent magnet inline gear motor supplied by Servo System Co., Montville, N.J.

Other mixing methods can be used as well. Two examples are given. First, a circulation pump can be installed to circulate the solution inside mixing chamber 400. Second, an air nozzle can be installed allowing air to bubble through the liquid for dispersing the liquid. Generally, any method of mixing can be used, including, but not limited to, sonication, tumbler, propeller, or vibration mixers, or blenders.

Illustratively, the mixing mechanism starts a prescribed time after receiving the first control signal. Alternatively, the mixing mechanism can start before or at the same time as solid fuel component dispenser 102 or liquid fuel component dispenser 104. The mixing mechanism can run continuously or as needed.

Figure 5:
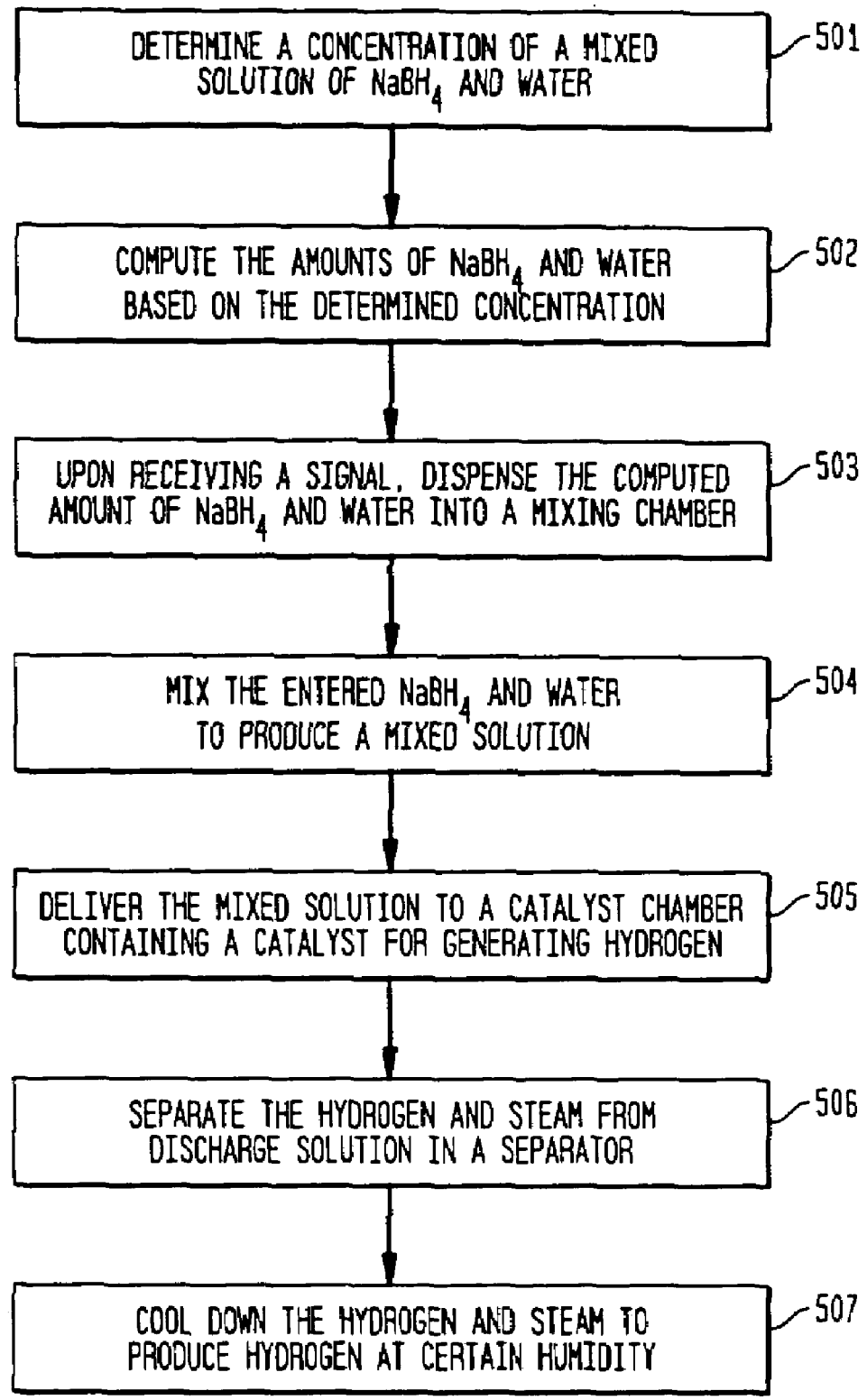
FIG. 5 shows a method for generating a hydrogen gas according to the principles of the invention.

Referring now to FIG. 5, a method for generating hydrogen using at least one complex metal hydride as the fuel is shown. Illustratively, the solid fuel component is $NaBH_4$ and is in the form of granules. At step 501, a concentration of a mixed solution of $NaBH_4$ and water is determined. At step 502, the amounts of $NaBH_4$ and water are computed based on the determined concentration. For example, if the determined concentration is 10% of $NaBH_4$ by weight. The amounts of $NaBH_4$ and water are water can be 100 grams and 900 milliliters, respectively. At step 503, upon receiving a signal, the computed amount of $NaBH_4$ and water are dispensed into a chamber. The dispensing of water and $NaBH_4$ can be started at the same time or one after the other. At step 504, the dispensed $NaBH_4$ and water are preferably mixed to produce a mixed solution. At step 505, the mixed solution is delivered to a catalyst chamber containing a catalyst. The catalyst activates the hydrolysis action of the mixed solution to generate hydrogen, steam, and discharged solution. At step 506, the hydrogen and steam are separated from the discharged solution in a separator. At step 507, the hydrogen and steam are cooled down at a heat exchanger, so that some steam is condensed, and the output hydrogen has desired humidity. If humidity is not a concern, step 507 can be omitted.

The examples given herein are presented to enable those skilled in the art to more clearly understand and practice the instant invention. The examples should not be considered as limitations upon the scope of the invention, but as merely being illustrative and representative of the use of the invention. Numerous modifications and alternative embodiments of the invention will be apparent to those skilled in the art in view of the foregoing description. For example, while the dispensing mechanisms in the disclosed embodiment are operative in response to the level of the mixture in chamber 103, they may be responsive to either one criteria or a plurality of criterion.

What is claimed is:

1. A system for generating hydrogen comprising:
   a first chamber;
   a hydrogen outlet connected to said first chamber;
   a catalyst chamber disposed between the first chamber and said hydrogen outlet;
   a solid fuel component storage tank;
   a solid fuel component dispenser in communication with said solid fuel component storage tank, said solid fuel component dispenser being configured to provide a predetermined amount of a solid fuel component from said solid fuel component storage tank to said first chamber;
   a liquid fuel component dispenser for providing a predetermined amount of a liquid fuel component to said first chamber, the mixture of said solid fuel component and said liquid fuel component capable of generating hydrogen via a chemical reaction;
   a control device configured to activate the solid fuel component dispenser in response to a control signal to provide said amount of solid fuel component to said first chamber; and
   a pump in communication with the first chamber for pumping the mixture of liquid and solid fuel components to the catalyst chamber.

2. The system of claim 1 wherein the predetermined amount of said solid fuel component and the predetermined amount of said liquid fuel component are different.

3. The system of claim 1 wherein the predetermined amount of said solid fuel component and the predetermined amount of said liquid fuel component are the same.

4. The system of claim 1 wherein said solid fuel component is a metal hydride and said liquid fuel component comprises water.

5. The system of claim 4 wherein said metal hydride is one or more metal hydrides selected from the group consisting of $LiBH_4$, $KBH_4$, $NH_4BH_4$, $(CH_3)_4NBH_4$, $NaAlH_4$, $KAlH_4$, $NaGaH_4$, $LiGaH_4$, and $KGaH_4$.

6. The system of claim 4 wherein said metal hydride is sodium borohydride.

7. The system of claim 1 wherein said solid fuel component is in pellet form.

8. The system of claim 1 wherein said catalyst chamber includes a catalyst of the type that accelerates the generation of hydrogen from the mixture of said solid and liquid fuel components.

9. The system of claim 8 wherein the catalyst chamber is serially connected to a separator, said separator being connected to said hydrogen outlet, and being capable of separating said hydrogen from other byproducts of said chemical reaction of said solid and liquid fuel components.

10. The system of claim 1 wherein said first chamber includes a mechanism for accelerating the mixing of said solid and liquid fuel components.

11. The system of claim 10 wherein said mechanism includes a stirring element that operates in response to magnetic forces.

12. The system of claim 1 wherein the solid fuel component also includes a stabilizer that raises the pH of the mixture of said solid fuel component and said liquid fuel component.

13. The system of claim 1 further comprising a sensor configured to detect the level of hydrogen in the system.

14. The system of claim 1 further comprising a sensor that measures the level of fuel in the first chamber.

15. The system of claim 1 wherein the solid fuel dispenser includes a mechanism for successively providing pellets of said solid fuel component one after the other to a predetermined position and further including an actuator mechanism for displacing each pellet in said predetermined position into said chamber.

16. The system of claim 15 wherein said mechanism utilizes a spring member to successively provide said pellets to said predetermined position.

17. A generator for producing hydrogen from a chemical reaction of a solid complex metal hydride and an aqueous solution, said generator comprising:
    a solid complex metal hydride dispenser;
    an aqueous solution dispenser;
    a first chamber for receiving a first predetermined amount of the solid complex metal hydride and a second predetermined amount of the aqueous solution from the respective dispensers, these received fuel components forming a mixture in said chamber;
    a hydrogen outlet connected to said first chamber;
    a catalyst chamber disposed between said first chamber and said hydrogen outlet;
    a control device configured to activate at least the solid complex metal hydride dispenser in response to a control signal to provide said amount of solid complex metal hydride to said first chamber; and
    a pump in communication with the first chamber and configured to pump the mixture of solution and solid fuel components to the catalyst chamber.

18. The generator of claim 17 wherein the catalyst chamber includes a catalyst for receiving said mixture, and said catalyst being of the type that accelerates the generation of hydrogen from said mixture of the solid complex metal hydride and solution.

19. The system of claim 17 wherein said first predetermined amount of the solid complex metal hydride and said second predetermined amount of said solution are different.

20. The system of claim 17 wherein said first predetermined amount of the solid complex metal hydride and said second predetermined amount of said solution are the same.

21. The hydrogen generator of claim 17 wherein the pH value of the mixture of said solid complex metal hydride and said solution in said chamber is less than 13.

22. The hydrogen generator of claim 17 wherein the solid complex metal hydride is in the form of pellets.

23. The hydrogen generator of claim 17 wherein said first chamber further includes a mixing mechanism for promoting the dissolution of the solid complex metal hydride into said solution.

24. The hydrogen generator of claim 18 wherein the pH value of the mixture of said solid complex metal hydride and said solution in said first chamber is not less than 13.

25. The hydrogen generator of claim 17 further comprising a dispensing mechanism for dispensing a stabilizer to raise the pH value of the mixture of said solid complex metal hydride and said solution.

26. The hydrogen generator of claim 17 wherein the solid complex metal hydride dispenser is configured to dispense a combination of the complex metal hydride and a stabilizer, both combined in a solid form, said stabilizer being one that raises the pH value of the mixture of said solid complex metal hydride and said solution.

27. The hydrogen generator of claim 17 further comprising a separator disposed between said catalyst chamber and said hydrogen outlet for separating said hydrogen from other byproducts of said chemical reaction of said solid complex metal hydride and said solution.

28. The system of claim 17 wherein the solid complex metal hydride dispenser successively provides pellets of said solid complex metal hydride one after the other to a predetermined position and displaces each pellet in said predetermined position into said chamber.

29. The system of claim 28 wherein the solid complex metal hydride dispenser comprises a spring member adapted to successively provide said pellets to said predetermined position.

\* \* \* \* \*